United States Patent
Wang et al.

(10) Patent No.: US 11,380,446 B2
(45) Date of Patent: Jul. 5, 2022

(54) RADIATION RESISTANT HIGH-ENTROPY ALLOY HAVING FCC STRUCTURE AND PREPARATION METHOD THEREOF

(71) Applicant: Dalian University of Technology, Dalian (CN)

(72) Inventors: Tongmin Wang, Dalian (CN); Yiping Lu, Dalian (CN); Tingju Li, Dalian (CN); Zhiqiang Cao, Dalian (CN); Huanzhi Zhang, Dalian (CN); Jinchuan Jie, Dalian (CN); Huijun Kang, Dalian (CN); Yubo Zhang, Dalian (CN); Zongning Chen, Dalian (CN); Enyu Guo, Dalian (CN)

(73) Assignee: Dalian University of Technology, Dalian (CN)

( * ) Notice: Subject to any disclaimer, the term of this patent is extended or adjusted under 35 U.S.C. 154(b) by 170 days.

(21) Appl. No.: 16/725,197

(22) Filed: Dec. 23, 2019

(65) Prior Publication Data
US 2020/0303083 A1  Sep. 24, 2020

(30) Foreign Application Priority Data
Mar. 21, 2019  (CN) .......................... 201910215740.X

(51) Int. Cl.
| | |
|---|---|
| G21C 3/07 | (2006.01) |
| G21F 1/12 | (2006.01) |
| C22C 1/02 | (2006.01) |
| C22C 30/00 | (2006.01) |
| G21F 1/08 | (2006.01) |

(52) U.S. Cl.
CPC .................. *G21C 3/07* (2013.01); *C22C 1/02* (2013.01); *C22C 30/00* (2013.01); *G21F 1/08* (2013.01); *G21F 1/125* (2013.01)

(58) Field of Classification Search
None
See application file for complete search history.

(56) References Cited

U.S. PATENT DOCUMENTS

2018/0036840 A1 * 2/2018 Hu ...................... B23K 15/0093

FOREIGN PATENT DOCUMENTS

| CN | 109252083 A | * | 1/2019 |
|---|---|---|---|
| JP | 2002-173732 | * | 6/2002 |

* cited by examiner

*Primary Examiner* — Xiaobei Wang
(74) *Attorney, Agent, or Firm* — Wood Herron & Evans LLP

(57) ABSTRACT

A radiation resistant high-entropy alloy is provided, having an FCC structure, defined by general formula of FeCoNiVMoTi$_x$Cr$_y$, where 0.05≤x≤0.2, 0.05≤y≤0.3, x and y are molar ratios. The radiation resistant high-entropy alloy has excellent irradiation resistance and is subject to radiation hardening saturation at high temperature (600° C.) in a condition of a high dose (1-3×10$^{16}$ ions/cm$^2$) of helium ion irradiation. A lattice constant of the high-entropy alloy decreases abnormally after irradiation. The high-entropy alloy has a radiation resistance far higher than that of a conventional alloy and has an excellent plasticity and specific strength. In an as-cast condition and at room temperature, a tensile break strength of the high-entropy alloy is higher than 580 MPa, an engineering strain (a tensile elongation) of the high-entropy alloy is greater than 30%.

8 Claims, 3 Drawing Sheets

RADIATION RESISTANT HIGH-ENTROPY ALLOY HAVING FCC STRUCTURE AND PREPARATION METHOD THEREOF

CROSS-REFERENCE TO RELATED APPLICATION

This application claims priority to Chimene Application No. 201910215740.X, filed Mar. 21, 2019. The above-mentioned patent application is incorporated herein by reference in its entirety.

TECHNICAL FIELD

The present invention relates to alloys and corresponding methods, and in particular, to a radiation resistant high-entropy alloy and a corresponding preparation method.

BACKGROUND

Metal materials commonly used in nuclear reactors include conventional alloys such as zirconium base alloy, stainless steel, titanium alloy, and nickel base alloy. None of these materials can meet radiation resistance requirements of key metal components in next generation nuclear reactors. Working conditions in the next generation nuclear reactors are extremely harsh. Structural materials, especially cladding materials used in nuclear reactors, undergo high temperature, high pressure, and intense neutron irradiation, resulting in defects such as vacancies, dislocation, element segregation in the materials; and aggregation of H and He atoms is produced by transmutation reactions. A large number of defects caused by irradiation greatly change mechanical properties of the materials, resulting in radiation effects such as radiation hardening, radiation embrittlement, and radiation swelling, thereby reducing the service life of the materials.

At present, fuel cladding materials and key metal components used in the nuclear power plant that are made of these conventional alloys all produce damage behaviors such as lattice expansion, irradiation swelling, fatigue oxidation acceleration during irradiation, which fails to meet use requirements of fuel cladding materials of next generation nuclear reactors.

Therefore, it is desirable to provide a radiation resistant high-entropy alloy having an FCC structure to address the foregoing problem that the conventional alloy has a poor irradiation performance and mechanical properties, as well as other deficiencies of the current art.

SUMMARY

To achieve the above purposes and overcome the technical defects in the art, embodiments of the present invention provide a radiation resistant high-entropy alloy having an FCC structure is prepared, defined by a general formula of FeCoNiVMoTi$_x$Cr$_y$, in which $0.05 \leq x \leq 0.2$, $0.05 \leq y \leq 0.3$, and x and y are molar ratios. The irradiation performance of such an alloy is far better than that of the conventional alloy and has good mechanical properties in an as-cast condition.

In some embodiments, in the general formula FeCoNiVMoTi$_x$Cr$_y$, $0.1 \leq x \leq 0.15$, and $0.1 \leq y \leq 0.2$.

In other embodiments, a method is provided for producing a radiation resistant high-entropy alloy having an FCC structure, including the following steps: stacking Fe, Co, Ni, V, Mo, Ti, and Cr according to a proportion, and conducting vacuum levitation melting or vacuum arc melting, to obtain the radiation resistant high-entropy alloy having an FCC structure.

In one embodiment, the process of vacuum levitation melting or vacuum arc melting includes the following steps: during fusion alloying, placing Ti, Fe, Co, and Ni at the bottom, and placing Mo, Cr, and V at the top.

In another embodiment, in the process of vacuum levitation melting or vacuum arc melting, vacuumizing is conducted to reach $5 \times 10^{-3}$ Pa to $3 \times 10^{-3}$ Pa, and back-filing with argon gas is conducted to reach 0.03 to 0.05 MPa. This vacuumizing can well protect the alloy melt from being oxidized.

In a further embodiment, alloy ingots are turned and melted five to seven times during vacuum arc melting, to ensure composition uniformity.

In yet another embodiment, alloy ingots are turned and melted four to six times during vacuum levitation melting, to ensure composition uniformity.

In another embodiment, Fe, Co, Ni, V, Mo, Ti, and Cr are all industrial grade pure raw materials with a purity of over 99.5 wt. %.

According to further embodiments of the invention an application is provided for use of the radiation resistant high-entropy alloy having an FCC structure, specifically by having the radiation resistant high-entropy alloy be integrated in fuel cladding materials in nuclear power plant reactors and/or key metal components of reactor cores of the nuclear power plant.

The radiation resistant high-entropy alloy having an FCC structure in the embodiments of the present invention has a scientific and reasonable formula and a simple and easy preparation method. Compared with the conventional designs, the radiation resistant high-entropy alloy having an FCC structure achieves the following technical advantages:

1. The radiation resistant high-entropy alloy having an FCC structure in the present invention contains specific element selection and composition, where Al can improve the oxidation resistance of the alloy; Cr can improve the corrosion resistance of the alloy; the elements Co and Ni can improve high-temperature performance; the element V can improve the intensity of the alloy; and the element Mo can increase the service temperature of the alloy; and the elements Ti and Fe have good comprehensive performance. When a specific proportion of these elements is used, the alloy has a cocktail effect, and can have excellent mechanical properties and radiation resistance.
2. The alloy has excellent mechanical properties in an as-cast condition, the ingots obtained in a condition of non-consumable vacuum arc melting are of a single-phase FCC structure, and do not need to be subject to any heat treatment process and deformation strengthening process. At room temperature, a tensile break strength of the high-entropy alloy is higher than 580 MPa, and an engineering strain (a tensile elongation) of the high-entropy alloy is greater than 30%.
3. The radiation resistant high-entropy alloy having an FCC structure in the present invention has excellent ion irradiation resistance, and an alloy sample is subject to radiation hardening saturation at high temperature in a condition of a high dose ($1-3 \times 10^{16}$ ions/cm$^2$) of helium ion irradiation.
4. After helium ion irradiation, a lattice constant of the alloy in the present invention decreases abnormally, while this is quite different from a case in which lattices of the conventional alloy expand and a lattice constant the conventional alloy increases after irradiation.

5. Elements in the radiation resistant high-entropy alloy having an FCC structure in the present invention are easy to obtain, and the preparation method of the alloy is simple, and only conventional vacuum arc smelting or vacuum magnetic suspension smelting needs to be used. The alloy can achieve excellent mechanical properties without being subject to heat treatment and a subsequent complex processing technology.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, explain the one or more embodiments of the invention.

DETAILED DESCRIPTION

The following clearly and completely describes the technical solutions in the embodiments of the present invention with reference to the accompanying drawings in the embodiments of the present invention. To make objectives, features, and advantages of the present invention clearer, the following describes embodiments of the present invention in more detail with reference to the accompanying drawing and specific implementations.

Embodiment 1

This first embodiment provides a radiation resistant high-entropy alloy Fe—Co—Ni—V—Mo—Ti—Cr having an FCC structure, defined by a general formula of FeCoNiVMoTi$_{0.1}$Cr$_{0.1}$.

A specific preparation method of FeCoNiVMoTi$_{0.1}$Cr$_{0.1}$ includes: stacking raw materials Fe, Co, Ni, V, Mo, Ti, and Cr according to a molar ratio shown by the general formula, where Fe, Co, Ni, V, Mo, Ti, and Cr are all industrial grade pure raw materials with a purity of over 99.5 wt. %; conducting vacuum arc melting or vacuum levitation melting; during fusion alloying, placing Ti, Fe, Co, and Ni at the bottom, and placing Mo, Cr, and V at the top; and conducting vacuumizing to reach $5 \times 10^{-3}$ Pa, and back-filing with argon gas to 0.05 MPa. Each alloy ingot is melted at least five times during arc melting, to ensure composition uniformity.

Figure 1:
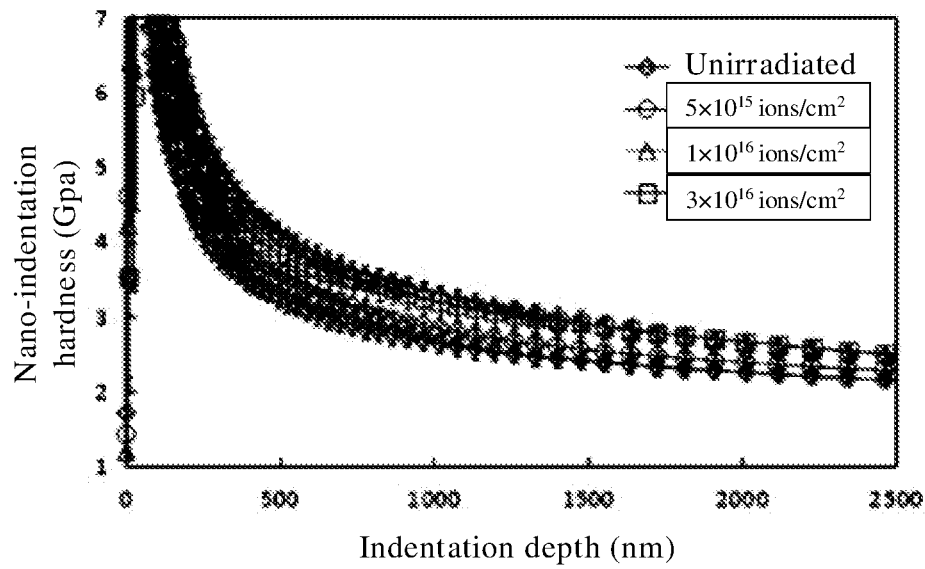
FIG. 1 is a graphical plot showing relationships between average nano-indentation hardness and indentation depths at 600° C. before and after irradiation according to a first embodiment, where three different doses of irradiation are $5 \times 10^{15}$ ions/cm$^2$, $1 \times 10^{16}$ ions/cm$^2$, and $3 \times 10^{16}$ ions/cm$^2$.
Figure 2:
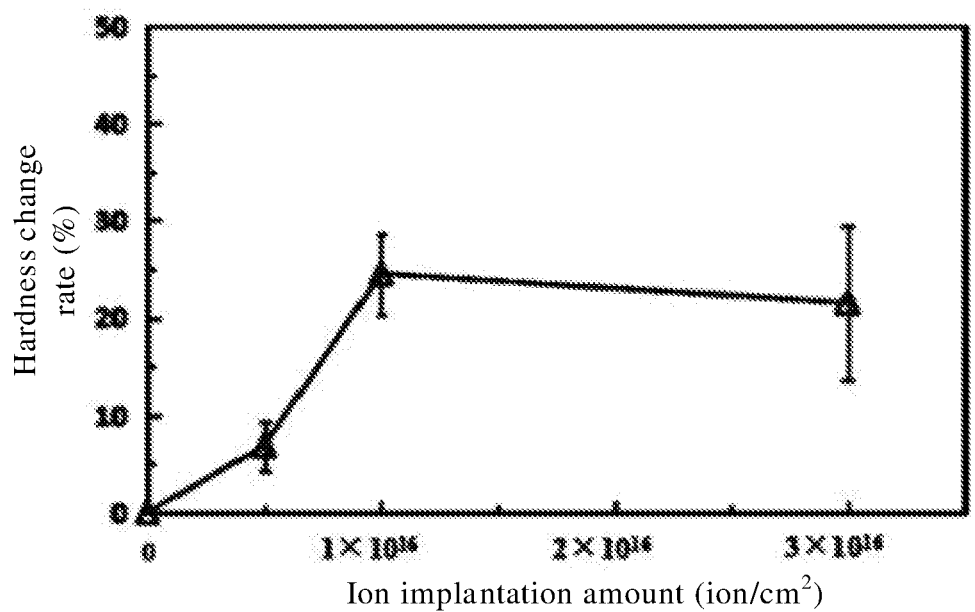
FIG. 2 is a graphical plot showing a relationship between a hardness change rate and an ion implantation amount of a radiation resistant high-entropy alloy having an FCC structure at 600° C. according to the first embodiment.

FIG. 1 shows relationships between average nano-indentation hardness and indentation depths at 600° C. before and after irradiation according to this embodiment. It can be learned from the figure that, compared with a conventional alloy, the alloy in the present invention is subject to radiation hardening saturation during radiation, but the damage is not increased as the radiation increases, and the alloy has excellent irradiation resistance. FIG. 2 shows a relationship between a hardness change rate and an ion implantation amount of a radiation resistant high-entropy alloy having an FCC structure at 600° C. according to this embodiment. A radiation hardening degree of a radiation resistant high-entropy alloy sample having an FCC structure in this embodiment increases as a radiation dose increases, and is subject to radiation hardening saturation when a high dose ($1-3 \times 10^{16}$ ions/cm$^2$) of helium ions are implanted.

Figure 3:
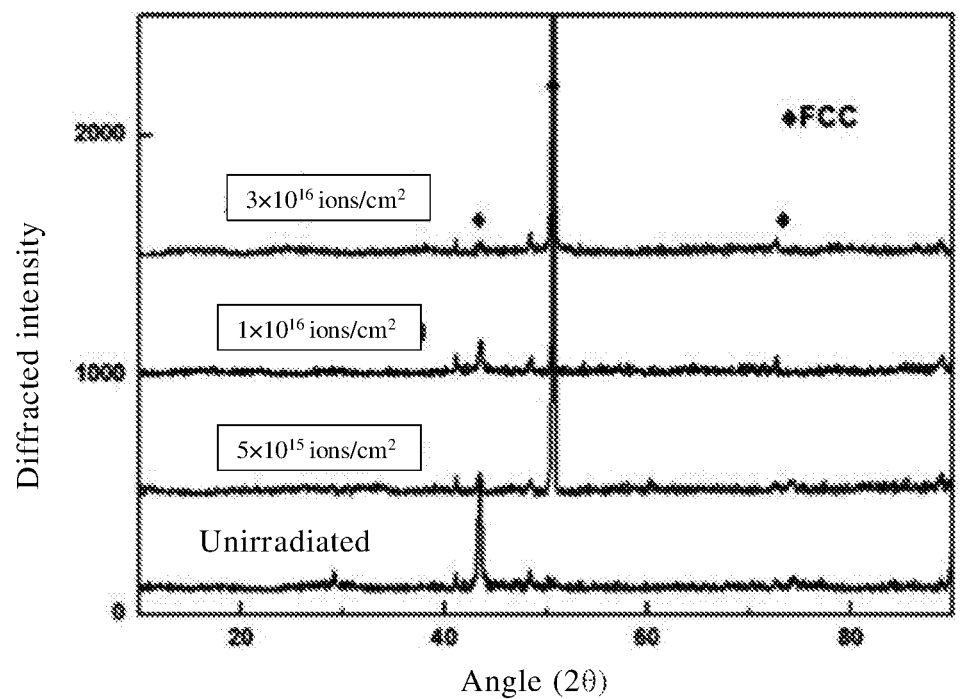
FIG. 3 is a graphical plot showing XRD diffraction analysis patterns of a radiation resistant high-entropy alloy having an FCC structure before and after irradiation experiments according to the first embodiment, where once again, three different doses of irradiation are $5 \times 10^{15}$ ions/cm$^2$, $1 \times 10^{16}$ ions/cm$^2$, and $3 \times 10^{16}$ ions/cm$^2$.
Figure 4:
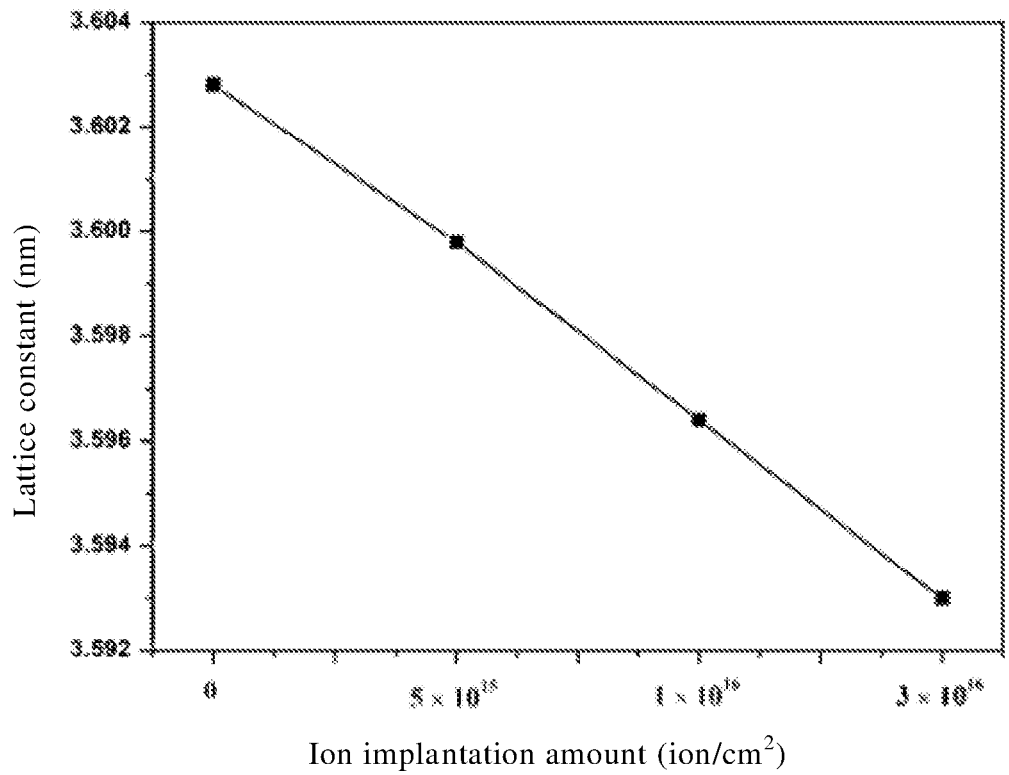
FIG. 4 is a graphical plot of a variation trend of a lattice constant of a radiation resistant high-entropy alloy having an FCC structure as an irradiation dose changes according to the first embodiment.

FIG. 3 shows XRD diffraction analysis patterns of the radiation resistant high-entropy alloy FeCoNiVMoTi$_{0.1}$Cr$_{0.1}$ having an FCC structure before and after irradiation experiments according to this embodiment, and shows that the alloy is formed by an FCC structural phase both before and after irradiation experiments, is not subject to a phase change or does not produce a precipitated phase. The irradiation-resistant high entropy alloy in this embodiment has excellent irradiation stability. FIG. 4 shows a variation trend of a lattice constant of a radiation resistant high-entropy alloy having an FCC structure as an irradiation dose changes according to this embodiment. FIG. 3 and FIG. 4 show that a lattice constant of the alloy after irradiation decreases, while a lattice constant of a conventional alloy after irradiation increases, and therefore an irradiation behavior of the alloy is quite different from that of the conventional alloy.

An alloy irradiation experiment process may be conducted as follows: First, a sample of the irradiation resistant high-entropy alloy having an FCC structure in this embodiment is cut into slices with a thickness of 1 mm (10 mm×6.5 mm) for double-sided fine grinding and single-side polishing. Then, a test sample is placed in an aqueous solution containing 50% H$_2$SO$_4$ and 40% glycerol for electropolishing at a voltage of 36V for 10 seconds; and is subject to ultrasonic cleaning with acetone, anhydrous ethanol, and deionized water. An irradiation experiment is conducted on the prepared sample at 600° C., where helium ion irradiation with energy of 3 MeV is adopted, and irradiation doses are $5 \times 10^{15}$ ions/cm$^2$, $1 \times 10^{16}$ ions/cm$^2$, and $3 \times 10^{16}$ ions/cm$^2$, respectively.

Figure 5:
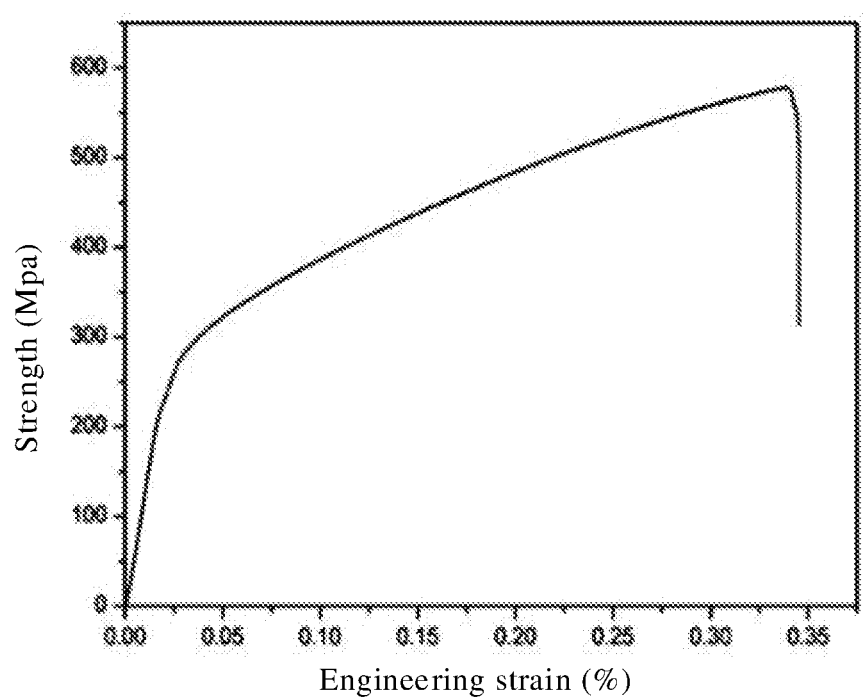
FIG. 5 is a graphical plot of an engineering strain curve of a radiation resistant high-entropy alloy having an FCC structure at room temperature according to the first embodiment.

FIG. 5 shows an engineering strain curve of a radiation resistant high-entropy alloy having an FCC structure at room temperature according to this embodiment, and shows excellent mechanical properties of the alloy.

Embodiment 2

This second embodiment provides a radiation resistant high-entropy alloy having an FCC structure, defined by a general formula of FeCoNiVMoTi$_{0.15}$Cr$_{0.15}$. A preparation method of the radiation resistant high-entropy alloy in this embodiment is the same as that in Embodiment 1, described above.

It is detected that $FeCoNiVMoTi_{0.15}Cr_{0.15}$ is in this embodiment and $FeCoNiVMoTi_{0.1}Cr_{0.1}$ in Embodiment 1 both have excellent mechanical properties and radiation resistance, and can be widely applied to fuel cladding materials in nuclear power plant reactors or metal components of reactor cores of the nuclear power plant.

The present invention is not limited to description of the radiation resistant high-entropy alloy according to either exemplary embodiment described herein. To this end, changes in x and y and modifications made to the preparation method all fall within the protection scope of the present invention.

The embodiments described above are only descriptions of preferred embodiments of the present invention, and are not intended to limit the scope of the present invention. Various variations and modifications can be made to the technical solution of the present invention by those of ordinary skills in the art, without departing from the design of the present invention. The variations and modifications should all fall within the claimed scope defined by the claims of the present invention.

What is claimed is:

1. A radiation resistant high-entropy alloy having an FCC structure, defined by a general formula of $Fe_1Co_1Ni_1V_1Mo_1Ti_xCr_y$, wherein $0.1 \leq x \leq 0.15$, and $0.1 \leq y \leq 0.2$, and a subscript of each element in the general formula represents a molar ratio.

2. The radiation resistant high-entropy alloy having an FCC structure of claim 1, wherein the radiation resistant high-entropy alloy is integrated in fuel cladding materials in nuclear power plant reactors and/or components of reactor cores of a nuclear power plant.

3. A method of producing a radiation resistant high-entropy alloy having an FCC structure, comprising:
   stacking Fe, Co, Ni, V, Mo, Ti, and Cr according to a proportion, and
   conducting vacuum levitation melting or vacuum arc melting, to obtain the radiation resistant high-entropy alloy having an FCC structure,
   wherein the radiation resistant high-entropy alloy having an FCC structure produced is defined by a general formula of $Fe_1Co_1Ni_1V_1Mo_1Ti_xCr_y$, wherein $0.1 \leq x \leq 0.15$, $0.1 \leq y \leq 0.2$, and a subscript of each element in the general formula represents a molar ratio.

4. The method of claim 3, wherein the step of vacuum levitation melting or vacuum arc melting comprises:
   during fusion alloying, placing Ti, Fe, Co, and Ni at the bottom, and placing Mo, Cr, and V at the top.

5. The method of claim 3, wherein in the vacuum levitation melting or vacuum arc melting, vacuumizing is conducted to reach $5 \times 10^{-3}$ Pa to $3 \times 10^{-3}$ Pa, and back-filing with argon gas is conducted to reach 0.03 MPa to 0.05 MPa.

6. The method of claim 3, wherein alloy ingots are turned and melted five to seven times during the vacuum arc melting.

7. The method of claim 3, wherein alloy ingots are turned and melted four to six times during the vacuum levitation melting.

8. The method of claim 3, wherein Fe, Co, Ni, V, Mo, Ti, and Cr are all industrial grade pure raw materials with a purity of over 99.5 wt. %.

* * * * *